(12) United States Patent
Schulz et al.

(10) Patent No.: US 9,547,074 B2
(45) Date of Patent: Jan. 17, 2017

(54) SYSTEM AND METHOD FOR USING COMBINING COUPLERS WITH ASYMMETRIC SPLIT RATIOS IN A LIDAR SYSTEM

(71) Applicant: Digital Signal Corporation, Chantilly, VA (US)

(72) Inventors: Stephan Schulz, Bethesda, MD (US); Hani Daniel, Rockville, MD (US)

(73) Assignee: Digital Signal Corporation, Chantilly, VA (US)

( * ) Notice: Subject to any disclaimer, the term of this patent is extended or adjusted under 35 U.S.C. 154(b) by 0 days.

(21) Appl. No.: 14/249,085

(22) Filed: Apr. 9, 2014

(65) Prior Publication Data

US 2015/0293211 A1 Oct. 15, 2015

(51) Int. Cl.
*G01S 7/491* (2006.01)

(52) U.S. Cl.
CPC ................... *G01S 7/4917* (2013.01)

(58) Field of Classification Search
CPC ........ G01S 7/4861; G01S 7/497; G01S 17/00; G01S 17/10; G01S 7/48
USPC ................................. 356/3.01–5.15
See application file for complete search history.

(56) References Cited

U.S. PATENT DOCUMENTS

2004/0085526 A1* 5/2004 Gogolla et al. .............. 356/4.01
2005/0213103 A1* 9/2005 Everett ................ A61B 5/0066
356/479

* cited by examiner

*Primary Examiner* — Luke Ratcliffe
(74) *Attorney, Agent, or Firm* — Toering Patents PLLC

(57) ABSTRACT

A laser radar, or "lidar" system, employs an asymmetric single-ended detector to detect received signals reflected back from targets. The asymmetric single-ended detector benefits from a reduced part count and fewer optical splices while nearly achieving a same gain as a symmetric differential detector.

10 Claims, 5 Drawing Sheets

SYSTEM AND METHOD FOR USING COMBINING COUPLERS WITH ASYMMETRIC SPLIT RATIOS IN A LIDAR SYSTEM

FIELD OF THE INVENTION

The invention is generally related to lidar system (i.e., laser radar systems), and more particularly, using asymmetric split ratio combining couplers and single-ended detection.

BACKGROUND OF THE INVENTION

Various conventional lidar systems (i.e., laser radar systems) employ coherent detection, in which a received optical signal is combined with a mixing or reference optical signal, typically with a symmetric combining coupler, to produce an interference signal. A symmetric combining coupler is a combining coupler with a power transfer ratio of 50% between its two output ports (i.e., each port receives 50% of the output power from the combing coupler).

In some conventional systems, the interference signal from a single port of the symmetric combining coupler is applied to a detector to produce a detected signal. This is referred to as single-ended detection. Because the two ports of the symmetric combining coupler each produce an interference signal with a 180-degree phase difference from one another, these two interference signals may be combined to produce a differential signal that can subsequently be applied to a detector to produce a detected signal. This is referred to as differential detection.

Optical systems employing single-ended detection typically employ fewer detectors and require fewer optical fiber splices. However, such optical systems employing single-ended detection experience a 3 dB loss in signal-to-noise ratio (SNR) over those employing differential detection. Because of this, optical systems that require higher sensitivity (such as lidar systems) typically employ differential detection with symmetric combining couplers rather than single-ended detection.

What is needed is a lidar system that employs single-ended detection that does not suffer the SNR losses of conventional systems.

SUMMARY OF THE INVENTION

According to various implementations of the invention, a laser radar, or "lidar" system, employs an asymmetric single-ended detector to detect received signals reflected back from targets. The asymmetric single-ended detector benefits from a reduced part count (as compared with a differential detector) and fewer optical splices while achieving nearly a same gain as a symmetric differential detector.

Various implementations of the invention are directed toward a lidar system that includes a laser source configured to generate a laser output; a splitter configured to split the laser output into a transmit signal and a mixing signal; and a single-ended detector comprising: an asymmetric combiner configured to combine a received signal and the mixing signal and output a combined signal, wherein the received signal is a reflected portion of the transmit signal reflected back from a target and received by the lidar, wherein the asymmetric combiner has a split ratio greater than 0.5, and a detector configured to detect the combined signal.

Various implementations of the invention are directed toward a method for detecting a reflected signal from a target, the method comprising: receiving the reflected signal from the target; combining the received signal with a mixing signal using an asymmetric combiner having a split ratio greater than 0.5 to generate a combined signal; and detecting the combined signal using a single-ended detector.

These implementations, their features and other aspects of the invention are described in further detail below.

BRIEF DESCRIPTION OF THE DRAWINGS

FIG. 4 illustrates a relationship between e-Field inputs and outputs from a combining coupler having a split ratio, $\sigma$.

DETAILED DESCRIPTION

As discussed above, conventional lidar systems that employ single-ended detection use fewer receive detectors and require fewer fiber-optic splices than their double-ended, differential detection counterparts; however, detection in such conventional lidar system experiences a 3 dB loss in signal-to-noise ratio (SNR) in relation to conventional lidar systems that employ differential detection. According to various implementations of the invention, asymmetric combining couplers may be used in a lidar system employing single-ended detection to substantially reduce these losses in SNR. Moreover, in various implementations of the invention, use of the asymmetric combining couplers does not increase the cost of parts or labor, or increase package size in comparison with conventional single-ended detection systems.

According to various implementations of the invention, an asymmetric combining coupler with an asymmetric split ratio between its output ports (e.g., 80%/20%, 90%/10%, etc.) may be used in the lidar system. In order to fully recognize the gains (i.e., increased sensitivity, improvement in SNR, etc.) of the asymmetric combining couplers in such systems, a power level of a reference signal (also referred to as a mixing signal) may be adjusted in relation to the asymmetric split ratio used.

Figure 1:
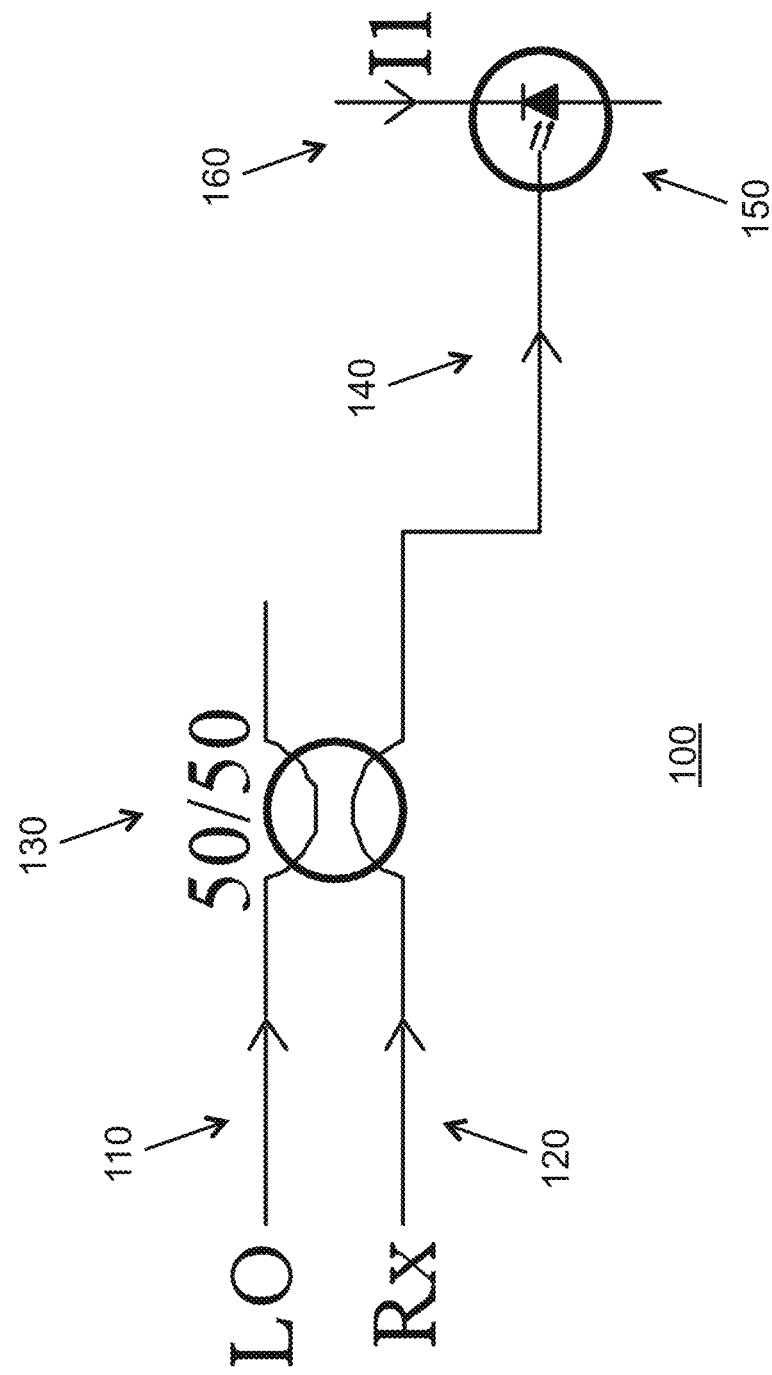
FIG. 1 illustrates a conventional symmetric single-ended detector.

Before discussing various implementations of the invention, conventional detectors are first described. FIG. 1 illustrates a conventional symmetric single-ended detector 100. Symmetric single-ended detector 100 includes an optical mixing signal 110 (sometimes referred to herein as an "LO signal") and a received optical signal 120 (typically reflected from a target as would be appreciated). Depending on the application, optical mixing signal 110 may be a time-shifted (i.e., time-delayed) version of an actual transmit signal as would be appreciated. Received optical signal 120 and optical mixing signal 110 may be mixed together, for example, via a coupler having a symmetric split ratio (e.g., 50/50) such as a coupler 130. An output 140 of coupler 130 is applied to an electro-optical detector 150, which as illustrated may be a PIN diode. Detector 150 converts optical power (e.g., from coupler 130) to an electrical current 160 as would be appreciated. Current 160 may be subsequently measured as would be appreciated.

Figure 2:
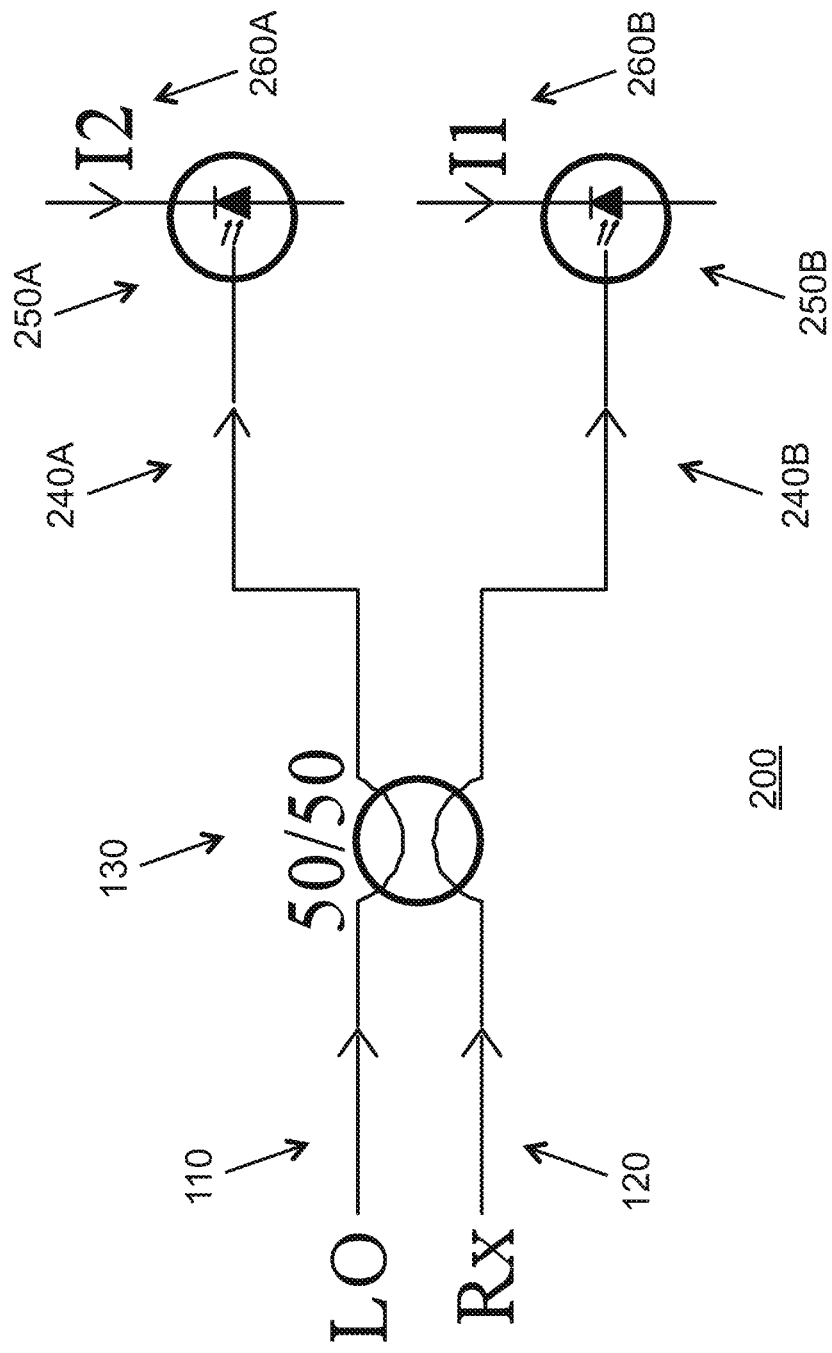
FIG. 2 illustrates a conventional symmetric double-ended detector.

FIG. 2 illustrates a conventional symmetric double-ended detector 200. Symmetric double-ended detector 200 includes an optical mixing signal 110 (which, again, may be a time-shifted version of the transmit signal) and a received optical 120. Received optical signal 120 and optical mixing signal 110 may be mixed together, for example, via a coupler having a symmetric split ratio (e.g., 50/50) such as coupler 130. With detector 200, both outputs 240 (illustrated as an output 240A and an output 240B) of coupler 130 are applied to electro-optical detectors 250 (illustrated as an electro-optical detector 250A and an electro-optical detector 250B). Detectors 250A, 250B convert optical power to electrical currents 260A, 260B, respectively, which may be subsequently measured as would be appreciated. Creating a difference signal between these two currents typically realizes a sensitivity gain of 3 dB over the single-ended detector 100 as would be appreciated.

Figure 3:
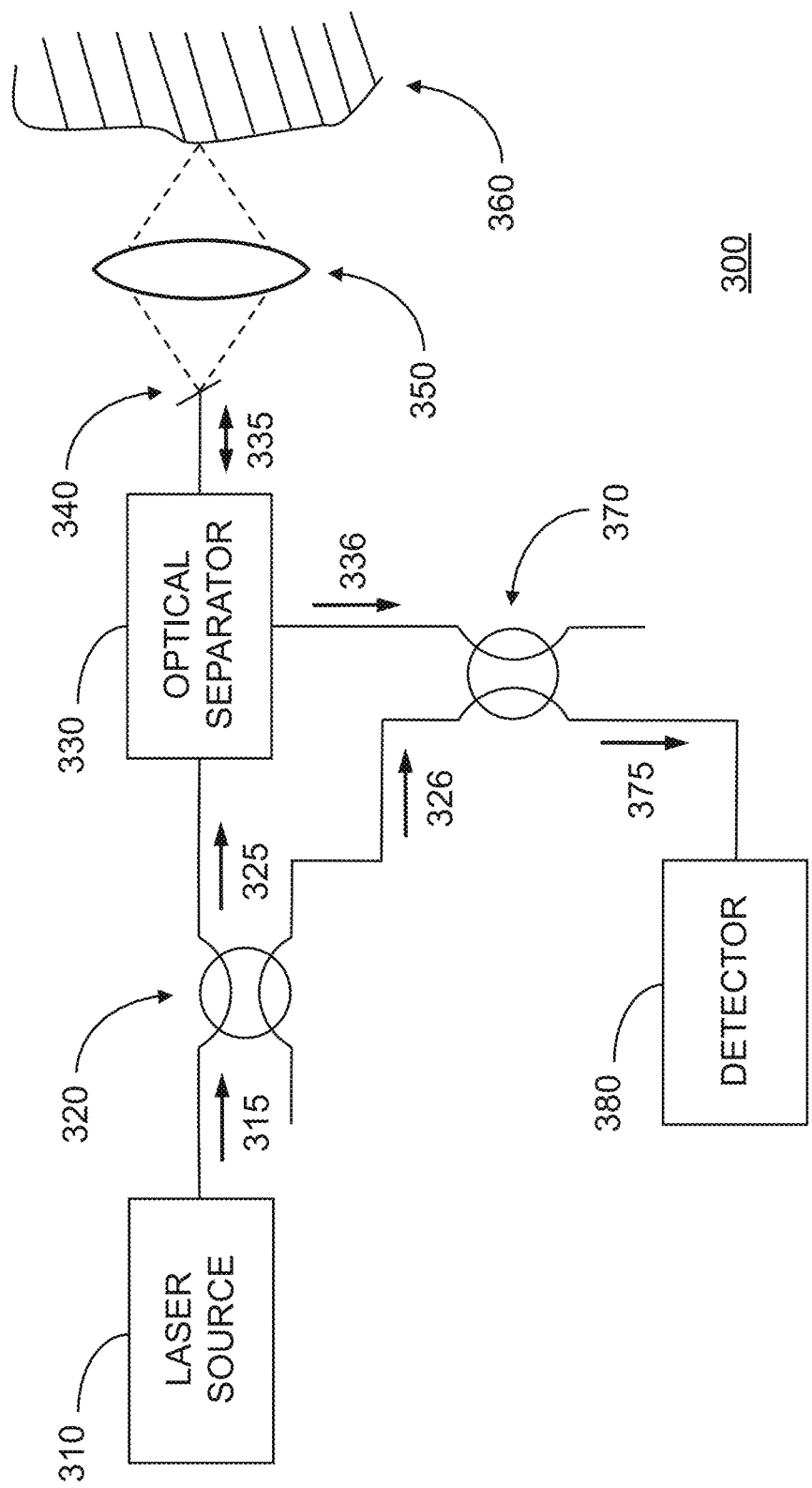
FIG. 3 illustrates a lidar system (i.e., laser radar) according to various implementations of the invention.

A simple lidar system employing asymmetric detection is now described in accordance with various implementations of the invention. FIG. 3 illustrates a lidar system 300 (i.e., laser radar) according to various implementations of the invention. Lidar system 300 includes a coherent laser source 310 that outputs an optical signal 315, which in turn propagates to a splitting coupler 320. Splitting coupler 320 splits output optical signal 315 into two components, a transmit signal 325 and a mixing signal 326 (i.e., an LO signal).

Transmit signal 325 propagates through a optical separator 330 onto a fiber tip 340, from which it transitions into free space, is focused by a lens system 350 onto a target 360 and reflected back as a reflected signal. The reflected signal follows a path back in the opposite direction through lens system 350 and fiber tip 340 and back to optical separator 330.

Optical separator 330 separates transmit signal 325 from the reflected signal and outputs a receive signal 336. In various implementations of the invention, optical separator 330 may be a circulator, a splitter, or other suitable optical separator that separates transmit signal 325 from the reflected signal as would be appreciated.

Receive signal 336 and mixing signal 326 are combined by a combining coupler 370 to output a combined signal 375. In some implementations of the invention, a gain or attenuation stage (not otherwise illustrated) may be applied to mixing signal 326 prior to reaching combining coupler 370 in order to adjust mixing signal 326 to an anticipated power level of receive signal 336 as would be appreciated. According to various implementations of the invention, combining coupler 370 is single-ended and utilizes an asymmetric split ratio as discussed in further detail below.

Combined signal 375 is provided to a detector 380 to convert the combined signal 375 to an electrical signal for measurement as would be appreciated.

More complex lidar systems may benefit from various implementations of the invention as would be appreciated. For example, in some implementations of the invention, lidar system 300 may be incorporated into a dual laser source, chirped coherent laser radar system capable of unambiguously and simultaneously measuring both range and Doppler velocity of a point on target 360. Such a laser radar system is described in U.S. Pat. No. 8,582,085 entitled "Chirped Coherent Laser Radar with Multiple Simultaneous Measurements," which is incorporated herein by reference in its entirety.

The amplitudes of noise power and signal power under certain conditions are derived for both conventional symmetric single-ended detector 100 and conventional symmetric differential detector 200 and are now described. Afterwards, an effect of varying the split ratio of combining coupler 370 is explored.

For purposes of this discussion, the signal-to-noise ratio (SNR) of the electrical output of a detector is described as the power of the component with the frequency difference of LO and Rx signals relative to the noise power in a given receive bandwidth. To explore the effect of varying the split ratio of combining coupler 370 on the resulting SNR of the output of detector 380, an analytical expression for the field strength at a detector surface and the resulting detector current is derived. Absolute values of noise levels or SNR are not of interest here, but rather the relative gain or loss of SNR relative to a symmetric coupler (i.e., a couple having a split ratio of 0.5 or "50/50"). Because relative gains are calculated, physical constants and their associated units are omitted.

For illustrative purposes, this derivation of relative SNR is based on the following assumptions:

The receive signal (i.e., Rx signal) is of substantially lower power than the transmit signal (i.e., LO signal). Therefore, the noise power density at the detector output is determined only by the fraction of optical power from the LO signal reaching the detector surface.

The detector is not saturated, i.e. the optical power on the detector surface is within the limits of linear operation of the detector.

Detector shot noise is the only significant contributor to the overall noise level, all other noise sources are negligible.

The detector converts optical power to a current within a bandwidth significantly lower than the optical frequency. All frequency components of the optical power at the optical frequency or its multiples are averaged by the detector; only components at differences of optical frequencies are propagated as the signal to be detected.

With these assumptions, the electrical component of the optical LO signal electromagnetic field (i.e., E-field) may be described as:

$$LO(t) = E_{LO} * \cos(\omega_{LO}(t) * t + \phi_{LO})$$

where $E_{LO}$ denotes the field strength;

$\omega_{LO}(t)$ is the time-varying optical frequency of the LO signal; and $\phi_{LO}$ is the LO signal phase at t=0.

Similarly, the receive signal may be described as:

$$Rx(t) = E_{Rx} * \cos(\omega_{Rx}(t) * t + \phi_{Rx})$$

where $E_{Rx}$ denotes the field strength;

$\omega_{Rx}(t)$ is the time-varying optical frequency of the Rx signal; and $\phi_{Rx}$ is the Rx signal phase at t=0.

Figure 4:
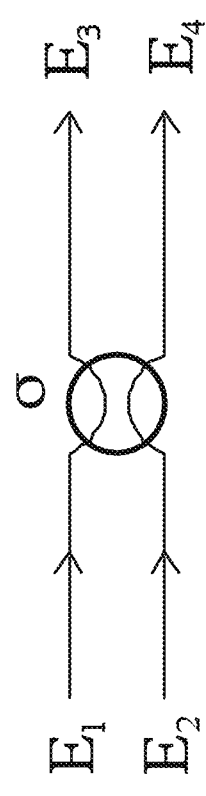
FIG. 4 illustrates a relationship between e-Field inputs and outputs for a combining coupler having a split ratio, $\sigma$.

Symmetric coupler 130 is a reciprocal and symmetric four-port device which exhibits a power split ratio, σ, between its two inputs $E_1$, $E_2$ and its two outputs $E_3$, $E_4$ as illustrated in FIG. 4. The E-fields of the optical inputs are propagated according to the following transfer matrix:

$$\begin{vmatrix} E_3 \\ E_4 \end{vmatrix} = \begin{vmatrix} \sqrt{1-\sigma} & -j*\sqrt{\sigma} \\ -j*\sqrt{\sigma} & \sqrt{1-\sigma} \end{vmatrix} * \begin{vmatrix} E_1 \\ E_2 \end{vmatrix}$$

Figure 5:
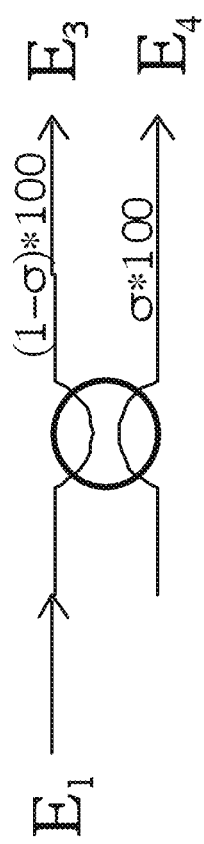
FIG. 5 illustrates respective scaling factors between e-Field inputs and outputs form a combining coupler having a split ratio, $\sigma$.

In many applications of these couplers, only three of the four ports are used and the unconnected port is terminated to eliminate back reflection. In such applications the split ratio of the ports on one side relative to the one port on the other side is indicated as a percentage such as illustrated in FIG. 5.

For single-ended detectors, the power split ratio of a given coupler is $\sigma$, where $0 < \sigma < 1$. For symmetric couplers, $\sigma = 0.5$; whereas for asymmetric couplers, (e.g., $\sigma < > 0.5$), the power from the Rx input reaching the detector is scaled by $\sigma$; and the power from the LO input reaching the detector is scaled by $1-\sigma$. The starting phases $\phi_{LO}$ and $\phi_{Rx}$ are arbitrary because the phase at $t=0$ depends on the location of the measurement.

The electrical field strength of the optical signal at the output of the coupler connected to the detector may be expressed as:

$$E_1 = \sqrt{\sigma}*E_{Rx}*\sin(\omega_{Rx}(t)*t+\phi_{Rx}) + \sqrt{1-\sigma}*E_{LO}*\cos(\omega_{LO}(t)*t+\phi_{LO})$$

As indicated, both components $E_{Rx}$ and $E_{LO}$ are scaled with the square root of the respective split ratio (i.e., either the square root of $\sigma$ or the square root of $1-\sigma$). The detector current is proportional to the square of this field strength.

$$I_1 = \eta * E_1^2$$

The proportionality factor $\eta$ contains the detector efficiency, among other constants. Only the SNR change relative to split ratio is of interest; the detector efficiency does not affect this ratio and is omitted in the following equations.

After squaring the expression for $E_1$ and rearranging with trigonometric identities, the detector current can be expressed as:

$$I_1 \sim \frac{\sigma}{2}*E_{Rx}^2*(1-\cos(2*\omega_{Rx}(t)*t+2*\varphi_{Rx})) + $$
$$\frac{1-\sigma}{2}*E_{LO}^2*(1+\cos(2*\omega_{LO}(t)*t+2*\varphi_{LO})) + $$
$$\sqrt{\sigma-\sigma^2}*E_{Rx}*E_{LO}*\sin((\omega_{Rx}(t)-\omega_{LO}(t))*t+\varphi_{Rx}-\varphi_{LO}) + $$
$$\sqrt{\sigma-\sigma^2}*E_{Rx}*E_{LO}*\sin((\omega_{Rx}(t)+\omega_{LO}(t))*t+\varphi_{Rx}+\varphi_{LO})$$

The first term is the contribution of the receive power and is negligible due to the assumption of low receive signal power. The second term is the main contribution to the total detector power from the LO signal; the shot noise power density of the resulting electrical current scales with the square root of this power. The third term is the mixing product with the frequency difference between Rx and LO inputs. This term is in a frequency range detectable by the detector and is converted into the electrical receive signal. The fourth term describes a signal at twice the optical frequency; since it does not produce an average current and is proportional to the receive field strength, its contribution to the total detector power is negligible.

The detector will average all frequency components at optical frequency or above and the detector current then may be expressed as:

$$I_1 \sim \frac{\sigma}{2}*E_{Rx}^2 + \frac{1-\sigma}{2}*E_{LO}^2 + $$
$$\sqrt{\sigma-\sigma^2}*E_{Rx}*E_{LO}*\sin((\omega_{Rx}(t)-\omega_{LO}(t))*t+\varphi_{Rx}-\varphi_{LO})$$

and the resulting contribution to the detector current by average power on the detector surface is therefore given by:

$$I_{avg} \sim \frac{1-\sigma}{2}*E_{LO}^2$$

To arrive at an SNR expression relative to the case of the symmetric coupler ($\sigma = 0.5$), the shot noise power and therefore the average detector current are held constant by adjusting the power of the LO signal according to the split ratio. The square of the field strength of the LO signal for symmetric split ratio is denoted as $N_{LO}^2$ and given by:

$$I_{avg} \sim 0.25*N_{LO}^2 = \frac{1-\sigma}{2}*E_{LO}^2$$

Expressing the LO power supplied to the coupler in terms of split ratio while keeping the average detector current constant yields:

$$E_{LO} = \frac{1}{\sqrt{2*(1-\sigma)}}*N_{LO}$$

The receive signal of interest is given by the third term in the equation for detector current:

$$I_{sig} \sim +\sqrt{\sigma-\sigma^2}*E_{Rx}*E_{LO}*\sin((\omega_{Rx}(t)-\omega_{LO}(t))*t+\phi_{Rx}-\phi_{LO})$$

Accounting for the adjustment of LO power depending on split ratio, the signal current will then become $$I_{sig} \sim +\sqrt{\sigma-\sigma^2}*E_{Rx}*\frac{1}{\sqrt{2*(1-\sigma)}}* $$
$$N_{LO}*\sin((\omega_{Rx}(t)-\omega_{LO}(t))*t+\varphi_{Rx}-\varphi_{LO})$$

and after some simplification:

$$I_{sig} \sim +\sqrt{\frac{\sigma}{2}}*E_{Rx}*N_{LO}*\sin((\omega_{Rx}(t)-\omega_{LO}(t))*t+\varphi_{Rx}-\varphi_{LO})$$

with the RMS amplitude $$I_{sig\_RMS} \sim \sqrt{\frac{\sigma}{2}}*E_{Rx}*N_{LO}$$

Shot noise current density in the electrical signal is proportional to the square root of the average detector current; multiplying with the square root of some fixed receive bandwidth yields the noise current magnitude:

$$I_{noise\_RMS} = \sqrt{2*q*I_{avg}*Bw}$$

where q is the elementary charge and Bw is the receive bandwidth.

Inserting the equation for average current and ignoring the constant 2*q gives:

$$I_{noise\_RMS}(\sigma) \sim \frac{N_{LO}}{2} * \sqrt{Bw}$$

The RMS noise current is not depending on split ratio which is expected, because LO power level was adjusted for average noise current to be independent of split ratio.

$$SNR(\sigma) = 10 * \log_{10}\left(\frac{I^2_{sig\_RMS}}{I^2_{noise\_RMS}}\right) \sim 10 * \log_{10}\left(\sigma * E^2_{Rx} * \frac{1}{Bw}\right)[dB]$$

The ratio of signal amplitudes over split ratio given constant noise power translates directly to the SNR dependency in dB on split ratio relative to σ=0.5:

$$SNR_{rel}(\sigma) = SNR(\sigma) - SNR(0.5) = 10 * \log_{10}(2*\sigma) \; [dB]$$

For differential detectors, the power split ratio of the coupler is σ, where 0<σ<1; for symmetric couplers σ=0.5. For asymmetric couplers, the power from the Rx input reaching a first detector is scaled by σ and the power from the LO input reaching the first detector is scaled by 1−σ. These scaling factors are reversed for the second detector, i.e., the power from the Rx input reaching the second detector is scaled by 1−σ and the power from the LO input reaching the second detector is scaled by σ. Again, the starting phases are arbitrary.

The electrical field strength of the optical signal at the output of the coupler connected to the detector generating current $I_1$ (e.g., current 260B in FIG. 2) may be expressed as:

$$E_1 = \sqrt{\sigma} * E_{Rx} * \sin(\omega_{Rx}(t)*t + \phi_{Rx}) + \sqrt{1-\sigma} * E_{LO} * \cos(\omega_{LO}(t)*t + \phi_{LO})$$

and the optical field strength contained in the output of the coupler connected to the detector generating current $I_2$ (e.g., current 260A in FIG. 2) may be expressed as:

$$E_2 = \sqrt{1-\sigma} * E_{Rx} * \cos(\omega_{Rx}(t)*t + \phi_{Rx}) + \sqrt{\sigma} * E_{LO} * \sin(\omega_{LO}(t)*t + \phi_{LO})$$

The dependency of $I_1$ on $E_{LO}$ and $E_{Rx}$ is identical to the result derived for the single-ended case and given by:

$$I_1 \sim \frac{\sigma}{2} * E^2_{Rx} * (1 - \cos(2*\omega_{Rx}(t)*t + 2*\varphi_{Rx})) +$$
$$\frac{1-\sigma}{2} * E^2_{LO} * (1 + \cos(2*\omega_{LO}(t)*t + 2*\varphi_{LO})) +$$
$$\sqrt{\sigma - \sigma^2} * E_{Rx} * E_{LO} * \sin((\omega_{Rx}(t) - \omega_{LO}(t))*t + \varphi_{Rx} - \varphi_{LO}) +$$
$$\sqrt{\sigma - \sigma^2} * E_{Rx} * E_{LO} * \sin((\omega_{Rx}(t) + \omega_{LO}(t))*t + \varphi_{Rx} + \varphi_{LO})$$

The dependency of $I_2$ on $E_{LO}$ and $E_{Rx}$ is arrived at by squaring the expression for $E_2$:

$$I_2 \sim \frac{1-\sigma}{2} * E^2_{Rx} * (1 + \cos(2*\omega_{Rx}(t)*t + 2*\varphi_{Rx})) +$$
$$\frac{\sigma}{2} * E^2_{LO} * (1 - \cos(2*\omega_{LO}(t)*t + 2*\varphi_{LO})) -$$
$$\sqrt{\sigma - \sigma^2} * E_{Rx} * E_{LO} * \sin((\omega_{Rx}(t) - \omega_{LO}(t))*t + \varphi_{Rx} - \varphi_{LO}) +$$
$$\sqrt{\sigma - \sigma^2} * E_{Rx} * E_{LO} * \sin((\omega_{Rx}(t) + \omega_{LO}(t))*t + \varphi_{Rx} + \varphi_{LO})$$

The first terms are the contribution of the receive power and are negligible due to the assumption of low receive signal power. The second terms are the main contribution to the total detector power from the LO signal; the shot noise power densities of the resulting electrical signals scale with the square root of these powers. The third terms are the mixing products with the frequency difference between Rx and LO inputs. These terms are in a frequency range detectable by the PIN diode and their difference is converted into the electrical receive signal. The fourth terms describe signals at twice the optical frequency. Because these fourth terms do not produce an average current and are proportional to the receive field strength, their contributions to the total detector power are negligible.

The detectors will average all frequency components at optical frequency or above and the detector currents may be expressed as:

$$I_1 \sim \frac{\sigma}{2} * E^2_{Rx} + \frac{1-\sigma}{2} * E^2_{LO} +$$
$$\sqrt{\sigma - \sigma^2} * E_{Rx} * E_{LO} * \sin((\omega_{Rx}(t) - \omega_{LO}(t))*t + \varphi_{Rx} - \varphi_{LO})$$

$$I_2 \sim \frac{1-\sigma}{2} * E^2_{Rx} + \frac{\sigma}{2} * E^2_{LO} -$$
$$\sqrt{\sigma - \sigma^2} * E_{Rx} * E_{LO} * \sin((\omega_{Rx}(t) - \omega_{LO}(t))*t + \varphi_{Rx} - \varphi_{LO})$$

and the resulting contribution to the detector currents by average power on the detector surface may therefore be expressed as:

$$I_{avg1} \sim \frac{1-\sigma}{2} * E^2_{LO}$$

$$I_{avg2} \sim \frac{\sigma}{2} * E^2_{LO}$$

Shot noise current density in the electrical signals is proportional to the square root of the average detector currents:

$$I_{noise\_RMS} = \sqrt{2 * q * I_{avg} * Bw}$$

where q is the elementary charge and Bw is the receive bandwidth. Because the shot noise contributions of both detectors are mutually uncorrelated, the noise power of both detectors may be added to derive the resulting noise current of the differential arrangement for a given bandwidth. This yields the following dependence on split ratio:

$$I_{noise\_RMS\_DIFF}(\sigma) \sim \sqrt{1 - 2*\sigma + 2*\sigma^2} * E_{LO} * \sqrt{Bw}$$

The amplitudes of the receive signal of interest are given by the third term in the equations for detector current:

$$I_{sig1} \sim +\sqrt{\sigma - \sigma^2} * E_{Rx} * E_{LO} * \sin((\omega_{Rx}(t) - \omega_{LO}(t))*t + \phi_{Rx} - \phi_{LO})$$

$$I_{sig2} \sim -\sqrt{\sigma - \sigma^2} * E_{Rx} * E_{LO} * \sin((\omega_{Rx}(t) - \omega_{LO}(t))*t + \phi_{Rx} - \phi_{LO})$$

As noted above, the detection circuit determines the difference of the two currents, effectively doubling the amplitude of the signal current which may be expressed as:

$$I_{sig\_DIFF} = I_{sig1} - I_{sig2} \sim 2 * \sqrt{\sigma - \sigma^2} * E_{Rx} * E_{LO} * \sin((\omega_{Rx}(t) - \omega_{LO}(t))*t + \phi_{Rx} - \phi_{LO})$$

with the RMS amplitude $$I_{sig\_RMS\_DIFF} \sim \sqrt{2} * \sqrt{\sigma - \sigma^2} * E_{Rx} * E_{LO}$$

Unlike the scenario of single-ended detection, the LO power is kept constant. For asymmetric split ratios, the total shot noise power level is taken into account. The SNR dependence on split ratio may be expressed as:

$$SNR(\sigma) = 10*\log_{10}\left(\frac{I^2_{sig\_RMS\_DIFF}}{I^2_{noise\_RMS\_DIFF}}\right) \sim 10*\log_{10}\left(\frac{2*(\sigma-\sigma^2)}{1-2*\sigma+2*\sigma^2}*E^2_{Rx}*\frac{1}{Bw}\right)$$

SNR dependency on split ratio relative to $\sigma=0.5$ for differential detection may then be expressed as:

$$SNR_{rel}(\sigma) = SNR(\sigma) - SNR(0.5) = 10*\log_{10}\frac{2*(\sigma-\sigma^2)}{1-2*\sigma+2*\sigma^2}[dB]$$

For purposes of comparing detector efficiency in both architectures, the SNR dependence on split ratio for a given receive bandwidth may derived. As the calculations above show, SNR does not depend on LO power level as long as the assumptions stated at the beginning are valid.

The derivations of SNR for both architectures above gave the following results under identical neglect of proportionality constants (and physical units):

$$\text{Single-Ended: } SNR(\sigma) \sim 10*\log_{10}\left(\sigma*E^2_{Rx}*\frac{1}{Bw}\right)$$

$$\text{Differential: } SNR(\sigma) \sim 10*\log_{10}\left(\frac{2*(\sigma-\sigma^2)}{1-2*\sigma+2*\sigma^2}*E^2_{Rx}*\frac{1}{Bw}\right)$$

The single-ended case with $\sigma=0.5$ yields:

$$SNR(0.5) \sim 10*\log_{10}\left(0.5*\frac{E^2_{Rx}}{Bw}\right)$$

Expressing both SNR equations relative to the single-ended case with $\sigma=0.5$ yields:

$$\text{Single-Ended: } SNR_{rel\_SE}(\sigma) = 10*\log10(2*\sigma)$$

$$\text{Differential: } SNR_{rel\_DE}(\sigma) = 10*\log10\left(\frac{4*(\sigma-\sigma^2)}{1-2*\sigma+2*\sigma^2}\right)$$

Figure 6:
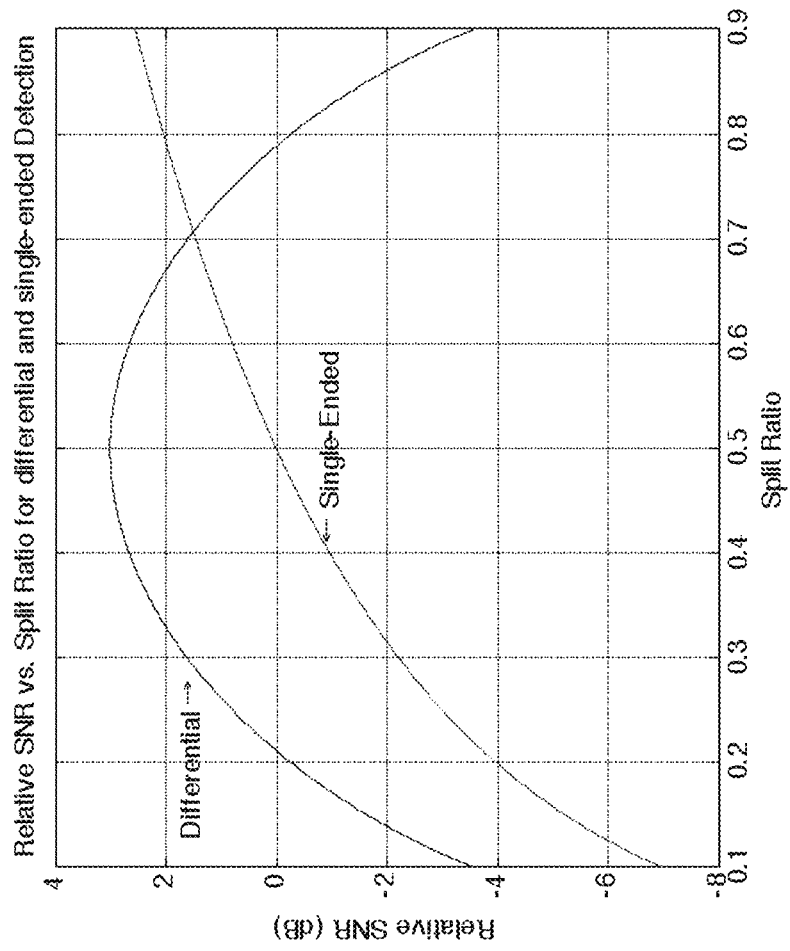
FIG. 6 illustrates gain curves for a single-ended detector in comparison with a differential detector as a function of split ratio.

FIG. 6 illustrates the relative SNR for both a single-ended detector and a differential detector over varying split ratios, $\sigma$. As illustrated, the relative SNR gain of differential detection over single-ended detection with a symmetric coupler is 3 dB. This is expected as differential detection adds signal amplitudes, equivalent to quadrupling the signal power, while the noise contributions of both coupler outputs are added in power, not amplitude. As also illustrated, the relative SNR gain of single-ended detection continues to increase with the increase of the split ratio until at an approximate split ratio, $\sigma=0.8$, the difference in gain between such a single-ended asymmetric detector and a symmetric differential detector is only roughly 1 dB; and at an approximate split ratio, $\sigma=0.9$, this difference in gain is even further reduced. Experimental results confirmed this analysis and the attendant assumptions.

Various implementations of the invention utilize asymmetric single-ended detection with a combining coupler 370 having a split ratio, $\sigma>0.5$. Various implementations of the invention utilize asymmetric single-ended detection with a combining coupler 370 having a split ratio, $\sigma>0.6$. Various implementations of the invention utilize asymmetric single-ended detection with a combining coupler 370 having a split ratio, $\sigma>0.7$. Various implementations of the invention utilize asymmetric single-ended detection with a combining coupler 370 having a split ratio, $\sigma>0.8$. Various implementations of the invention utilize asymmetric single-ended detection with a combining coupler 370 having a split ratio, $\sigma>0.9$. Various implementations of the invention utilize asymmetric single-ended detection with a combining coupler 370 having an empirical split ratio, $\sigma=0.7$. Various implementations of the invention utilize asymmetric single-ended detection with a combining coupler 370 having an empirical split ratio, $\sigma=0.8$. Various implementations of the invention utilize asymmetric single-ended detection with a combining coupler 370 having an empirical split ratio, $\sigma=0.9$.

While the invention has been described herein in terms of various implementations, it is not so limited and is limited only by the scope of the following claims, as would be apparent to one skilled in the art. These and other implementations of the invention will become apparent upon consideration of the disclosure provided above and the accompanying figures. In addition, various components and features described with respect to one implementation of the invention may be used in other implementations as well.

What is claimed is:

1. A lidar comprising:
   a laser source configured to generate a laser output;
   a splitter configured to split the laser output into a transmit signal and a mixing signal; and
   a single-ended detector comprising:
   an asymmetric combiner configured to combine a received signal and the mixing signal and output a combined signal, wherein the received signal is a reflected portion of the transmit signal reflected back from a target and received by the lidar, wherein the asymmetric combiner has a power split ratio greater than 0.5, and
   a detector configured to detect the combined signal.

2. The lidar of claim 1, wherein the asymmetric combiner has a power split ratio greater than or equal to 0.6.

3. The lidar of claim 1, wherein the asymmetric combiner has a power split ratio greater than or equal to 0.7.

4. The lidar of claim 1, wherein the asymmetric combiner has a power split ratio greater than or equal to 0.8.

5. The lidar of claim 1, wherein the asymmetric combiner has a power split ratio greater than or equal to 0.9.

6. The lidar of claim 1, wherein the asymmetric combiner has an empirical power split ratio of 0.8.

7. The lidar of claim 1, wherein the asymmetric combiner has an empirical power split ratio of 0.9.

8. The lidar of claim 1, wherein the asymmetric combiner comprises an asymmetric combining coupler.

9. The lidar of claim 1, wherein the detector comprises a PIN diode.

10. The lidar of claim 1, further comprising a gain stage or an attenuation stage configured to adjust a power level of the mixing signal prior to input to the asymmetric combiner.

* * * * *